Jan. 12, 1926.                    1,569,516
J. F. MANGHAM
TRANSMISSION MECHANISM
Filed Dec. 11, 1923    2 Sheets-Sheet 1
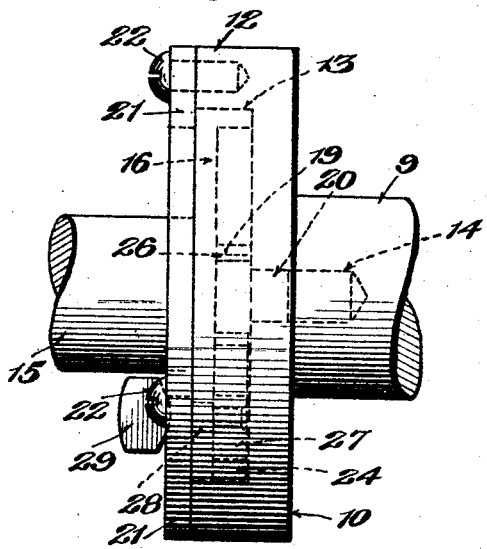
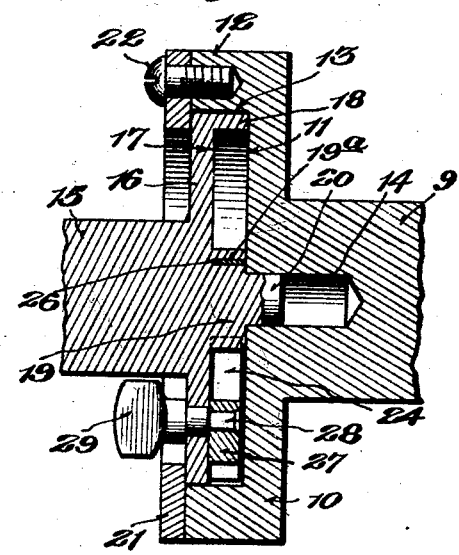
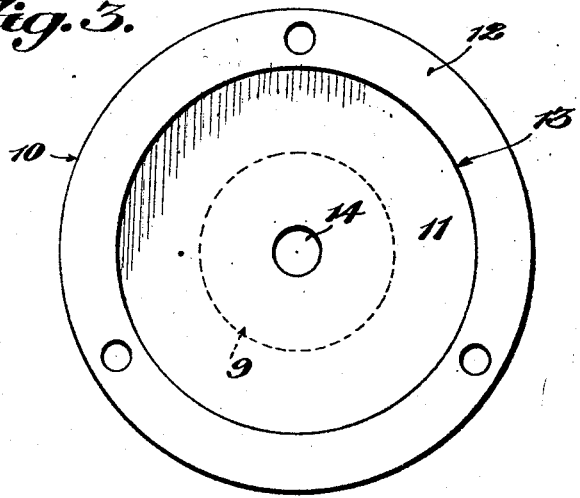
Inventor
John F. Mangham,
By Royal E. Burnham,
Attorney
Witness:-
Chas. L. Griesbauer

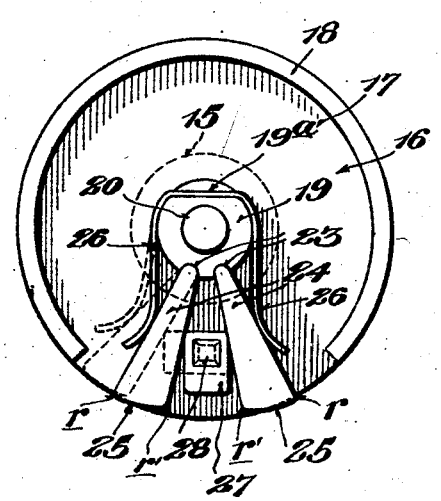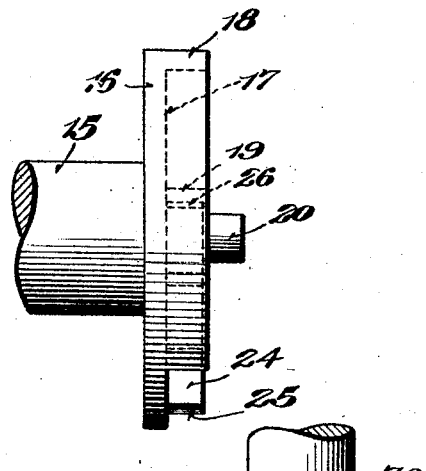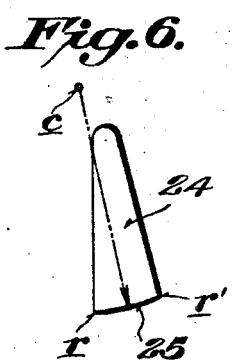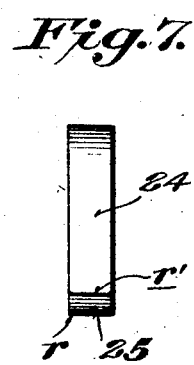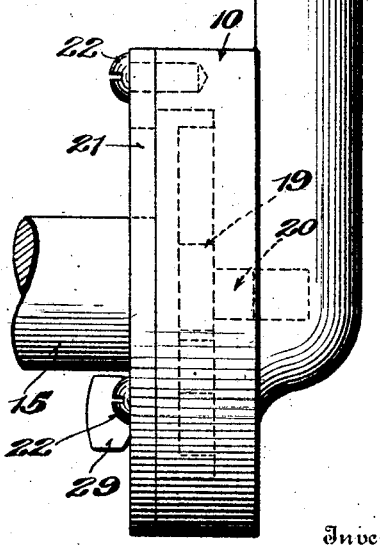

Patented Jan. 12, 1926.

1,569,516

UNITED STATES PATENT OFFICE.

JOHN F. MANGHAM, OF EL PASO, TEXAS.

TRANSMISSION MECHANISM.

Application filed December 11, 1923. Serial No. 679,995.

*To all whom it may concern:*

Be it known that I, JOHN F. MANGHAM, a citizen of the United States, residing at El Paso, in the county of El Paso and State of Texas, have invented certain new and useful Improvements in Transmission Mechanisms, of which the following is a specification, reference being had therein to the accompanying drawings.

This invention relates to transmission mechanism of the clutch type for imparting rotary movement from one rotary or oscillatory shaft or other member to another.

It is an object of the invention to provide an automatic transmission mechanism of a toothless ratchet form so arranged that one shaft or other member may be driven by another in either direction and one permitted to turn in the opposite direction independently of the other and the latter permitted to remain at rest or to turn in the driven direction, and also so arranged that both members may be locked together whereby either may drive or be driven by the other in both directions.

When considered in connection with the description herein, the characteristics of the invention will be apparent from the accompanying drawings, forming part hereof, wherein an adaptation of the invention is disclosed, for purposes of illustration.

Although the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawings, of which—

Fig. 1 is a side elevation of the assembled mechanism;

Fig. 2 is a longitudinal section thereof;

Fig. 3 is an end elevation of the female member;

Fig. 4 is an end elevation of the male member with certain movable parts in place therein;

Fig. 5 is a side elevation of the male member;

Fig. 6 is a front elevation of one of the dogs;

Fig. 7 is a side elevation of one of the dogs; and

Fig. 8 is a side elevation illustrative of employment of swingable members with the mechanism.

Having more particular reference to the drawings, 9 designates a shaft, which has on one end a disk-like member 10 formed with a plane surface 11 presented on the side opposite to the shaft and disposed at right angles to the shaft axis. The member 10 is formed with an annular flange 12 extending beyond the surface 11 on the side opposite to the shaft, and this flange has an inner bearing surface 13 concentric with the axis of the shaft. In the embodiment disclosed herein, the shaft, the member 10, and the flange 12 are of integral formation, and the member and flange constitute the female member of the mechanism. A seat or recess 14, concentric with the axis, extends inwardly from the plane surface 11, for a purpose hereinafter explained.

A shaft 15 has fast thereon a disk-like member 16 formed with a plane surface 17 disposed at right angles to the shaft axis and presented on the side opposite to the shaft. The member 16 is formed with an annular flange 18 extending beyond the surface 17 on the side opposite to the shaft 15 and having its outer periphery concentric with the axis and arranged to fit closely into the flange 12 and to have rotary movement therein. The flange 18 extends for the major distance around the periphery of member 16—say between five-sixths to four-fifths the distance—so that there is afforded a side opening between the flange terminals for a purpose hereinafter explained. A centrally-positioned boss 19 extends from the inner side of member 16, and therefrom projects a concentric extension 20 arranged to fit closely and to rotate in the seat 14. The member 16 and the parts thereon constitute the male member of the mechanism, and they preferably are of integral formation. The part 20 journaled in seat 14 holds the male and female members in coaxial relation. The end of boss 19 is arranged to bear against the inner surface of the member 10, and the parts are proportioned in such manner that, when the boss is in such contact, the opposite side of the member 16 is substantially in the same plane as the end surface of the flange 12.

The male and female members of the mechanism are held together by a flat ring 21, which overlaps the outer surface of the member 16 and is held on the flange 12 by screws 22 or other suitable removable fastenings.

The boss 19 has in its side oposite to the center of the opening through the flange 18 two adjacent axially-disposed seats or grooves 23, in each of which bears the smaller end of one of two wedge-shaped dogs 24. The opposite end of each dog is formed with a bearing surface 25, which is disposed in an arc whose center is to the side of the axis of the dog. Therefore, the distance from the boss end of the dog decreases from one end of the bearing surface to the other. That is, the bearing surface recedes from an arc centered in the boss recess and having as its radius the distance therefrom to the end of the dog at one side. By reference to Fig. 6, it will be seen that the recession is from point $r$ to point $r'$, each point being at a corner of the dog. In order that recession of the bearing surface may not be too great, it has been found to be preferable in practice to describe the arc of the dog bearing surface on a center that is beyond the opposite end of the dog, as shown at $c$ in Fig. 6.

When the mechanism is assembled, the shorter sides of the dogs face each other. The dogs extend into the opening between the terminals of the flange 18; they are swingable between those terminals; and, when they are in certain positions, their outer ends have frictional engagement against the bearing surface 13. The length of each dog, between the end in its boss seat and the portion of its bearing surface at and adjacent to the point $r$ of least recession, is slightly greater than the distance between that seat and the portion of the bearing surface 13 that may be at and adjacent to a point midway between the terminals of the flange 18, and it is slightly less than the distance between that seat and the portion of that bearing surface that may be adjacent to those terminals. Consequently, when a dog swings toward the median position between the terminals of flange 18, its bearing surface is wedged against the bearing surface 13 and rotary motion is imparted from the driving to the driven member of the mechanism.

In order to keep one or both dogs in median and clutching position, a U-shaped spring 26 is secured between its ends to the boss 19 in any suitable manner, as by being disposed in a slot 19ª as shown, and the ends of the spring bear against the outer sides of the dogs and tend to move them toward each other.

A key member 27, on a shaft 28 extending through the member 16 and turnable by a thumb-piece 29 on the shaft, is operable to contact with and to swing either of the dogs away from median position to inactive position and to hold it in the latter position.

When both dogs are in median or active position, the two clutch members are locked against relative movement in either direction, one dog resisting effort exerted in one direction and the other dog in the other direction, as both are in positions to be wedged against the bearing surface 13. With the key turned to hold one dog in inactive position, the other dog will be wedged against the bearing surface 13 when the effort of one of the clutch members is in the direction to move the dog toward median position, and, consequently, the other clutch member is driven; and, when the driving clutch member is turned in the other direction, the active dog will swing and release its clutching action and the driven clutch member will remain at rest or continue to rotate in the driven direction in accordance with the other parts with which it is associated.

The clutch members hereinbefore have been described as associated with shafts, one arranged to drive and the other to be driven by the mechanism. It is to be understood, however, that the invention is not limited to association with rotary shafts. For example, as shown by Fig. 8, one of the clutch members may be associated with an arm or lever 30 by which rotary movement is imparted thereto or which receives swinging movement from the member, the other clutch member turning or being turned when the lever moves or is moved in one direction, or it turns when the lever moves in both directions, dependent upon the condition of the dogs as controlled by the key.

Having thus described my invention, what I claim as new, and desire to secure by Letters Patent, is—

1. A transmission mechanism comprising a clutch member having an internal annular bearing surface, another clutch member rotatable inside of said bearing surface, a boss on said latter member, and two adjacently-positioned dogs bearing against said boss and one of them being arranged to engage frictionally against said bearing surface when relative effort of said clutch members is in one direction and the other dog being arranged to have like engagement when relative effort is in the opposite direction, said dogs being swingable away from each other out of such engagement.

2. A transmission mechanism comprising a clutch member having an internal annular bearing surface, another clutch member rotatable inside of said bearing surface, a boss on said latter member, two adjacently-positioned dogs bearing against said boss arranged to engage frictionally against said bearing surface and being swingable away from each other out of such engagement, and a turnable member between said dogs arranged to hold either of them in inactive position.

In testimony whereof I affix my signature.

JOHN F. MANGHAM.